United States Patent [19]

Saunders et al.

[11] 4,350,737

[45] Sep. 21, 1982

[54] POWER INSERTABLE NYLON COATED MAGNET WIRE

[75] Inventors: Hollis S. Saunders; Richard V. Carmer; Lionel J. Payette, all of Fort Wayne, Ind.

[73] Assignee: Essex Group, Inc., Fort Wayne, Ind.

[21] Appl. No.: 312,599

[22] Filed: Oct. 19, 1981

[51] Int. Cl.[3] .......................... B32B 27/00; H01B 7/00

[52] U.S. Cl. .......................................... 428/383; 29/596; 174/110 N; 174/120 SR; 427/118; 427/120

[58] Field of Search ........................ 428/375, 379, 383; 174/120 SR, 120 C, 110 N, 110 SR; 427/118, 120; 252/52 R, 56 R, 565; 29/596, 598, 606; 242/1.1 R, 1.1 A, 7.05 A, 7.05 B, 7.05 C, 7.03, 7.06, 7.07

[56] References Cited

U.S. PATENT DOCUMENTS

| | | | |
|---|---|---|---|
| 3,413,148 | 11/1968 | Sattler et al. | 117/218 |
| 3,446,660 | 5/1969 | Pendleton | 117/218 |
| 3,513,252 | 5/1972 | Schoerner | 428/383 |
| 3,632,440 | 1/1972 | Preston | 117/218 |
| 3,775,175 | 11/1973 | Merian | 117/218 |
| 3,856,566 | 12/1974 | Saunders | 117/218 |
| 3,953,649 | 4/1976 | Suzuki et al. | 428/383 |
| 3,975,571 | 8/1976 | Kawaguchi et al. | 428/383 X |
| 4,002,797 | 1/1977 | Hacker et al. | 428/378 |
| 4,004,063 | 1/1977 | Peterson et al. | 428/383 |
| 4,163,826 | 8/1979 | Kawaguchi et al. | 428/110 N X |
| 4,216,263 | 8/1980 | Otis et al. | 428/383 |

FOREIGN PATENT DOCUMENTS

| | | | |
|---|---|---|---|
| 55-80204 | 6/1980 | Japan | 174/120 SR |
| 55-80207 | 6/1980 | Japan | 174/120 SR |
| 55-80208 | 6/1980 | Japan | 174/120 SR |

OTHER PUBLICATIONS

European Patent Application No. 0-033-244, published Aug. 5, 1981 (Bulletin 8/31).

"Motor Winding Insertion" by Cal Towne, Electrical/Electronics Insulation Conference, Boston, Mass., Sep. 1979.

*Primary Examiner*—Lorraine T. Kendell
*Attorney, Agent, or Firm*—Harry J. Gwinnell

[57] ABSTRACT

A magnet wire having a nylon outer coating is described which is capable of power insertion into coil slots in a locking wire size range by virtue of a specific lubricant outer coating. The lubricant comprises a mixture of paraffin wax, hydrogenated triglyceride and ester lubricant composition comprising esters of fatty alcohols and fatty acids. An internal ester lubricant composition comprised of esters of fatty alcohols and fatty acids and/or an internal hydrogenated triglyceride lubricant composition can be added to the nylon coatings to further improve ease of insertability.

12 Claims, 1 Drawing Figure

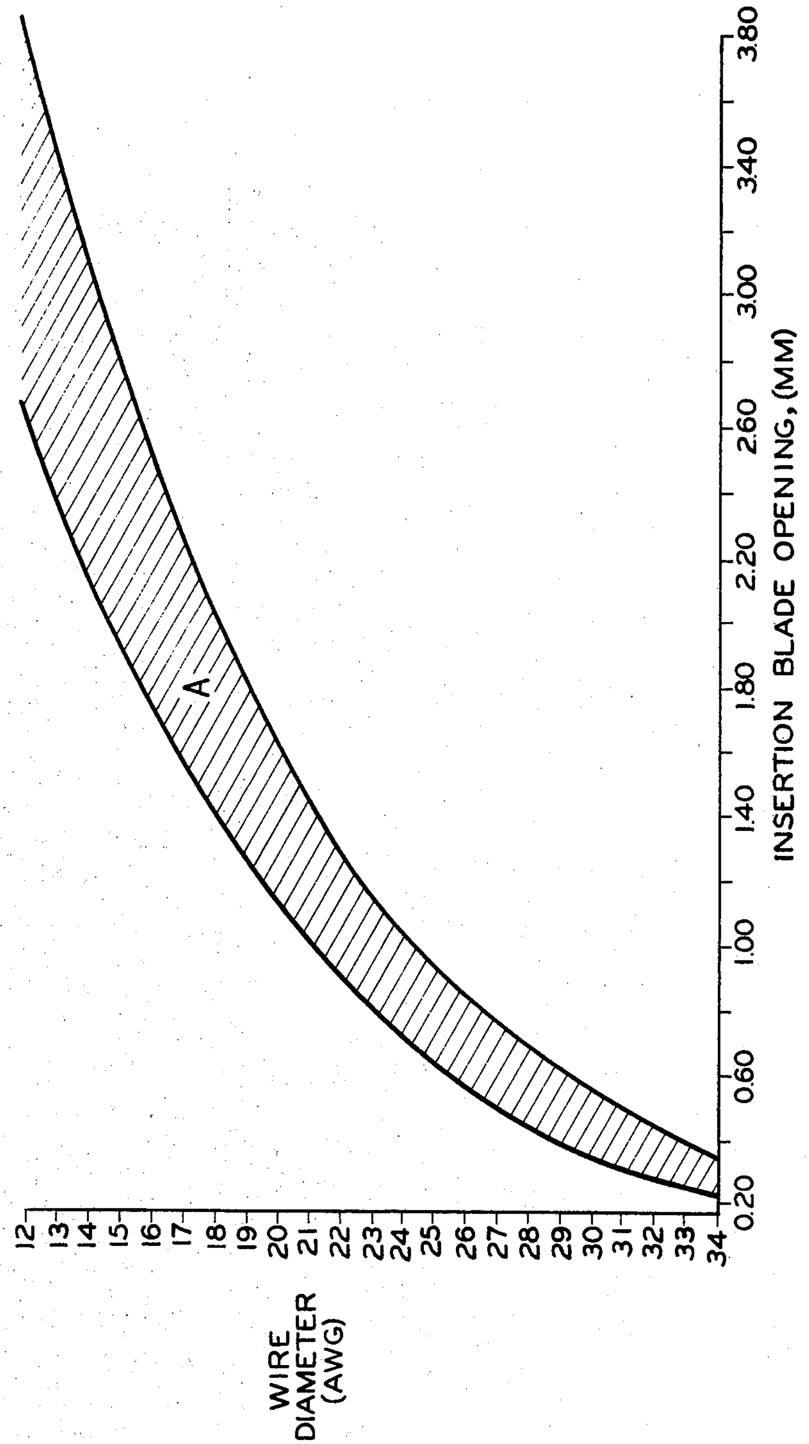
A
WIRE DIAMETER (AWG)
12
13
14
15
16
17
18
19
20
21
22
23
24
25
26
27
28
29
30
31
32
33
34
INSERTION BLADE OPENING, (MM)
0.20
0.60
1.00
1.40
1.80
2.20
2.60
3.00
3.40
3.80

POWER INSERTABLE NYLON COATED MAGNET WIRE

DESCRIPTION

1. Technical Field

The field of art to which this invention pertains is lubricant coatings for electrical conductors, and specifically lubricant coated magnet wire.

2. Background Art

In the manufacture of electrical motors, the more magnet wire which can be inserted into a stator core, the more efficient the motor performance. In addition to motor efficiency considerations, motor manufacturers are also interested in manufacture efficiency. Accordingly, such coils where possible are inserted automatically, generally by two methods: either a gun-winding method or a slot insertion method. In the older gun-winding method, the winding is done by carrying the wire into the stator slot by means of a hollow winding needle. Turns are made by the circular path of the gun to accommodate the individual coil slots. As described in Cal Towne's paper entitled "Motor Winding Insertion:" presented at the Electrical/Electronics Insulation Conference, Boston, Mass. in September, 1979, in the more preferred slot insertion, coils are first wound on a form, placed on a transfer tool and then pressed off the transfer tool into the stator core slots through insertion guides or blades. In order to accommodate these automated insertion methods, wire manufacturers have responded by producing magnet wires with insulating coatings with low coefficients of friction. Note, for example, U.S. Pat. Nos. 3,413,148; 3,446,660; 3,632,440; 3,775,175; 3,856,566; 4,002,797; 4,216,263; and Published European patent application No. 0-033-244, published Aug. 5, 1981 (Bulletin 8/31).

With the availability of such low friction insulating coatings motor manufacturers began to take advantage of such coatings by inserting an increasing number of wires per slot into the motors. However, it was also well known in this art that there existed a locking wire size range where based on the size of the insulated wires themselves, attempts at inserting a certain number of wires into a particular size slot opening at one time caused a wedging action of the wires with resulting damage to the coated wires. In spite of this fact, in the interest of efficiency and a better product, motor manufacturers continue to insert in a range closely approaching the locking wire size range even though discouraged from doing so by power insertion equipment manufacturers. And while nylon overcoated wires have been known to be successfully inserted in a locking wire size range, this cannot be done reliably on a regular basis as evidenced by surge failure testing, for example.

Accordingly, what is needed in this art, is an insulated magnet wire having a nylon insulation overcoating which can be power inserted into a coil slot in the locking wire size range without damage to the wire.

DISCLOSURE OF INVENTION

The present invention is directed to magnet wire having an outermost insulating layer of nylon overcoated with an external lubricant coating which allows it to be reliably power inserted into a coil slot in its locking wire size range without damage to the insulation. The lubricant comprises a mixture of paraffin wax, hydrogenated triglyceride and esters of fatty acids and fatty alcohols.

Another aspect of the invention is directed to wire as described above additionally containing in the nylon insulating layer an internal lubricant comprising esters of fatty acids and fatty alcohols.

Another aspect of the invention is directed to wire as described above additionally containing in the nylon insulating layer an internal lubricant comprising hydrogenated triglyceride.

Another aspect of the invention includes the method of producing such lubricated wires by applying the external lubricant composition in solution to the nylon insulation and drying the coated wire.

Another aspect of the invention includes the method of power inserting such wires into coil slots.

The foregoing, and other features and advantages of the present invention, will become more apparent from the following description and accompanying drawing.

BRIEF DESCRIPTION OF THE DRAWING

The FIGURE demonstrates power insertion locking wire size range as a function of coil slot opening size.

BEST MODE FOR CARRYING OUT THE INVENTION

It is important to use the components of the lubricant composition according to the present invention in particular proportions. In solutions in aliphatic hydrocarbon solvent, the paraffin wax should be present in an amount about 0.1% to about 4% by weight, the hydrogenated triglyceride present in about 0.1% to about 10% by weight, and the esters of fatty alcohols and fatty acids present in about 0.1% to about 10%, with the balance being solvent. The preferred composition comprises by weight about 1% paraffin wax, about 0.5% hydrogenated triglyceride, and about 0.5% esters of fatty alcohols and fatty acids, with balance solvent. While solution application is preferred, if solventless (i.e. Molten) application is used, the paraffin and triglyceride should be used in a ratio by weight of 1:15 to 60:1 and preferably in a ratio of about 2:1 and the triglycerides and esters in a ratio of about 30:1 and preferably in a ratio of about 1:1. The paraffin wax is preferably petroleum based having a melting point of 122° F. to 127° F. (50° C. to 52.8° C.). Eskar R-25 produced by Amoco Oil Company, having a refractive index of 1.4270 at 80° C., an oil content of 0.24%, specific gravity (at 60° F., 15.6° C.) of 0.839 and a flash point of 415° F. (212.8° C.) has been found to be particularly suitable.

The hydrogenated triglyceride is aliphatic hydrocarbon solvent soluble and has a melting point of 47° C. to 50° C. A hydrogenated triglyceride which has been found to be particularly suitable is Synwax #3 produced by Werner G. Smith, Inc. (Cleveland, Ohio) having an Iodine No. of 22–35, a Saponification No. of 188–195, an Acid No. of 5 (maximum) and has approximate fatty acid component proportions of $C_{14}$ fatty acids—8%, $C_{16}$ fatty acids—34%, $C_{18}$ fatty acids—27%, $C_{20}$ fatty acids—16%, and $C_{22}$ fatty acids—15%. A fatty acid ester composition which has been found to be particularly suitable is Smithol 76 produced by Werner G. Smith, Inc., which has a Saponification No. of 130–140, an Iodine No. of 85–95 and comprises (in approximate proportions) $C_{12}$ to $C_{14}$ fatty alcohol esters of tall oil fatty acids (54.6%), tripentaerythritol esters of tall oil fatty acids (24.5%), tetra-pentaerythritol esters of tall oil fatty acids (9.8%), free tall oil fatty acids (6.3%) and free $C_{12}$ to $C_{14}$ alcohols (4.8%).

The solvents for the solution applications of the lubricant composition according to the present invention are preferably aliphaic hydrocarbons with a rapid vaporization rate, but a flash point which is not so low as to present inordinate flammability dangers. Aliphatic hydrocarbons such as naphtha, heptane and hexane can be used. Lacolene™ produced by Ashland Chemical Company, an aliphatic hydrocarbon having a flash point (Tag closed cup) of 22° F. (−5.6° C.), an initial boiling point of 195° F. (90.6° C.) a boilding range of 195° F. (90.6%) to 230° F. (110° C.), a specific gravity at 60° F. (15.6° C.) of 0.6919 to 0.7129, and a refractive index at 25° C. of 1.3940 has been found to be particularly suitable. To reduce flammability dangers, any of the above materials may be used in admixture with Freon® solvents (duPont de Nemours and Co., Inc.).

Preferably a small amount of the above esters of fatty alcohols and fatty acids or the above hydrogenated triglyceride (or mixtures thereof) both of which are unreactive and insoluble in the nylon film can be added to the nylon insulation layer to further improve power insertability of the treated wires. Because of the insolubility of the fatty acid ester and triglyceride compositions in the nylon film, they will exude to the surface of the film, further enhancing power insertion in the locking wire size range. The fatty acid ester or triglyceride composition is added to the nylon in amounts of about 0.05% to about 8% by weight, with about 0.5% preferred for the triglyceride composition and about 1% for the fatty acid ester composition preferred. The fatty acid ester and triglyceride compositions can be added to the nylon enamel composition either as it is being formulated or after formulation and prior to application to the wire. In the latter case, the enamel composition should be heated up slightly above room temperature to aid in uniform mixing of the ester or triglyceride composition in the enamel.

As the electrical conducting base material, any electrical conductor which requires a lubricant can be treated according to the present invention, although the invention is particularly adapted to wire and specifically magnet wire. The wire is generally copper or aluminum ranging anywhere from 2 to 128 mils in diameter, with wires 10 mils to 64 mils being the most commonly treated wires according to the present invention. The insulating wire coatings to which the lubricant is applied generally range from about 0.2 to about 2 mils in thickness, and generally about 0.7 mil to 1.6 mils.

As the nylon insulating layer which is treated with the lubricants according to the present invention, any nylon based material conventionally used in this art can be used including such things as nylon 6, nylon 66, nylon 10, nylon 11, nylon 12, nylon 612, nylon 69 and mixtures and copolymers thereof. This material can be used as a sale coat or part of a multicoat system on such conventional basecoat material as polyesters, polyurethanes, polyvinylformals, polyimides, polyamide-imides, polyesterimides, etc. and combinations thereof. The lubricants according to the present invention are preferably used in conjunction with nylon 66 or urethane modified nylon 66 overcoated on polyester, and in particular glycerine or tris-hydroxyethyl isocyanurate based polyester basecoats. The preferred treated wire according to the present invention comprises about 75% by weight basecoat and about 25% by weight nylon overcoat based on total insulation coating weight.

The external lubricant can be applied by any conventional means such as coating dies, rollers or felt applicators. The preferred method of application utilizes a low boiling hydrocarbon solvent solution of the lubricant which can be applied with felt applicators and air dried, allowing a very thin "wash coat" film of lubricant to be applied to the wire. While the amount of lubricant in the coating composition may vary, it is most preferred to use approximately 1% to 3% of the lubricant dissolved in the aliphatic hycrocarbon solvent. And while any amount of lubricant coating desired can be applied, the coating is preferably applied to represent about 0.003% to about 0.004% by weight based on total weight of wire for copper wire, and about 0.009% to about 0.012% for aluminum wire.

EXAMPLE 1

A copper wire approximately 22.6 mils in diameter was coated with a first insulating layer of a THEIC based polyester condensation polymer of ethylene glycol, trishydroxyethyl isocyanurate and dimethylterephthalate. Over this was applied a layer of nylon 66. The insulating layers were approximately 1.6 mils thick with about 75% of the coating weight constituted by the polyester basecoat, and about 25% by the nylon topcoat.

500 grams of paraffin wax (Eskar R-25) and 250 grams of hydrogenated triglyceride (Synwax #3) and 250 grams of esters of fatty acids and fatty alcohols (Smithol 76) were added to approximately 9844 grams of aliphatic hydrocarbon solvent (Lacolene). The resulting solution had a clear appearance, a specific gravity at 25° C. of 0.7131±0.005, and an index refraction at 25° C. of 1.4034. The solvent was heated above room temperature, preferably to a point just below its boiling point. The paraffin wax was slowly brought to its melting point and added to the warm solvent. The hydrogenated triglyceride and fatty acid ester (if solid) compositions were similarly slowly brought to their melting point and added to the warm solvent. The blend was mixed thoroughly for 5 minutes. The nylon overcoated THEIC polyester wire was run between two felt pads partially immersed in the above formulated lubricant composition at a rate of about 70 feet to 80 feet per minute (21 M/min to 24 M/min) and the thus applied coating air dried. The lubricant represented about 0.003% to about 0.004% by weight of the entire weight of the wire.

EXAMPLE 2

The same procedure followed in Example 1 was performed here, with the exception that 0.5% by weight based on total weight of the nylon insulating layer was comprised of hydrogenated triglyceride (Synwax #3). The hydrogenated triglyceride composition was added to the nylon enamel when it was in solution prior to the application to the wire. Multiple windings of the thus lubricated wire were power inserted simultaneously into the stators in its locking wire size range with no damage to the insulated magnet wire. As can be clearly seen from the FIGURE, where the area A on the curve represents the locking wire size range as a function of insertion bladed coil slot opening (coil slot opening less 0.8 mm), for this wire size and coil slot size the coated wire was clearly within locking wire size range and yet inserted with no problem. In effect, what the lubricated wires according to the present invention have accomplished is to shrink area A in the FIGURE to the point of eliminating locking wire size restrictions for power insertable magnet wires according to the present invention.

As described above, problems have been incurred with the use of lubricant coated magnet wire in attempts to power insert in the locking wire size range. Previously, it was felt that conventional coefficient of friction testing was sufficient for predicting the feasibility of power inserting a particular magnet wire into coil slots. However, it has now been found that perpendicularly oriented wire to wire, and wire to metal (insertion blade composition and polish), coefficient of friction data at increasing pressure levels are necessary for true power insertion predictability. For example, in conventional coefficient of friction tests where both lubricant treated nylon and lubricant treated polyamide-imide coatings had identical coefficients of friction, the nylon could be made to successfully power insert and the polyamide-imide couldn't. The compositions of the present invention provide the necessary increasing pressure coefficient of friction properties to the insulated magnet wires for successful power insertion predictability.

While many of these components have been used as lubricants, and even as lubricants in the insulated electrical wire field, there is no way to predict from past performance how such lubricants would react to power insertion in coil slots in the locking wire size range specifically cautioned against by power insertion equipment manufacturers. Accordingly, it is quite surprising that the combination of such conventional materials in the ranges prescribed would allow for such reliably (substantially 100%) successful power insertion of nylon overcoated materials in the locking wire size range without damage to the insulated wire.

Although the invention has been primarily described in terms of the advantage of being able to power insert magnet wire according to the present invention in its locking wire size range, the lubricants of the present invention impart advantages to the magnet wires even when they are inserted outside the locking wire size range, and even when the magnet wires are not intended to be power inserted at all. For those magnet wires which are power inserted ouside the locking wire size range, less damage is imparted to the wires as compared to similar wires with other lubricants, and it is possible to insert at lower pressures which further lessens damage to the wires. This results in a much lower failure rate (e.g. under conventional surge failure testing) for power inserted coils made with wire according to the present invention than with other lubricated wires. And for those wires which are not power inserted, much improved windability is imparted to such wires, also resulting in less damage to the wires than with other lubricants.

Furthermore, although only particular compositions are specifically disclosed herein, it is believed that as a class, esters non-reactive with and insoluble in the nylon film insulation, resulting from reaction of $C_8$ to $C_{24}$ alcohols having 1 to 12 hydroxyls with $C_8$ to $C_{24}$ fatty acids including some portions containing free alcohol and free acid can be used as lubricants according to the present invention, either admixed with paraffin as an external lubricant, or alone (or as admixtures themselves) as internal lubricants. These materials can also be hydrogenated to reduce their unsaturation to a low degree. It is also believed from preliminary tesing that $C_{12}$ to $C_{18}$ alcohols and mixtures thereof are similarly suitable lubricants for use according to the present invention. However, even in this broad class only particular combinations have been found acceptable. Although not desiring to be limited to any particular theory it is believed that factors responsible for this are (1) the potential of the lubricants to interact in molecular fashion with the metal contact surface, e.g. the metal of the insertion blades, and (2) the ability of the lubricant to be or become liquid and stable under pressure condition, e.g. in the insertion process.

Although the invention has been shown and described with respect to detailed embodiments thereof, it will be understood by those skilled in the art that various changes in form and detail thereof may be made without departing from the spirit and scope of the claimed invention.

We claim:

1. A lubricated magnet wire comprising an electrically conducting substrate having an electrically insulating nylon outer coating, and a external lubricant coating on the nylon outer coating comprising a mixture of paraffin wax, hydrogenated triglyceride and an ester lubricant composition comprising esters of fatty alcohols and fatty acids, the ratio, by weight, of paraffin wax to triglyceride being about 1:15 to 60:1 and the ratio of triglyceride to ester lubricant being about 1:30 to 30:1, the coated magnet wire capable of power insertion into coil slots in its locking wire size range.

2. The wire of claim 1 having a ratio of paraffin wax to triglyceride of approximately 2:1 and a ratio of triglyceride to ester lubricant of approximately 1:1.

3. The wire of claim 2 wherein the paraffin wax has a melting point of 50° C. to 52.8° C., a refractive index of 1.4270 at 80° C., a specific gravity of 0.839 at 15.6° C., and a flash point of 212.8° C., the hydrogenated triglyceride has a melting point of 47° C. to 50° C., an Iodine No. of 22 to 35, a Saponification No. of 188 to 195, a maximum Acid No. of 5 and approximate fatty acid component proportions of 8% $C_{14}$, 34% $C_{16}$, 27% $C_{18}$, 16% $C_{20}$ and 15% $C_{22}$ fatty acids, and the ester lubricant composition has a Saponification No. of 130–140, an Iodine No. of 85–95 and comprises, in approximate percents, 54.6% of $C_{12}$ to $C_{14}$ fatty alcohol esters of tall oil, 24.5% tri-pentaerythritol esters of tall oil fatty acids, 9.8% tetrapentaerythritol esters of tall oil fatty acids, 6.3% free tall oil fatty acids and 4.8% free $C_{12}$ to $C_{14}$ alcohols.

4. The wire of claims 1, 2 or 3 having an electrically insulating layer of polyester, polyvinylformal or polyurethane between the substrate and the nylon outer coating.

5. The wire of claims 1, 2 or 3 which additionally contains in the nylon insulatng layer about 0.05% to about 8% by weight of an internal lubricant comprising esters of fatty acids and fatty alcohols.

6. The wire of claims 1, 2 or 3 which additionally contains in the nylon insulating layer about 0.05% to about 8% by weight of an internal lubricant comprising hydrogenated triglyceride.

7. The wire of claim 5 having an electrically insulating layer of polyester, polyvinylformal or polyurethane between the substrate and the nylon outer coating.

8. The wire of claim 6 having an electrically insulating layer of polyester, polyvinylformal or polyurethane between the substrate and the nylon outer coating.

9. The wire of claim 5 wherein the internal lubricant is present in about 1% by weight, has a Saponification No. of 130–140, an Iodine No. of 85–95 and comprises, in approximate percents, 54.6% of $C_{12}$ to $C_{14}$ fatty alcohols esters of tall oil, 24.5% tri-pentaerythritol esters of tall oil fatty acids, 9.8% tetra-pentaerythritol esters of tall oil fatty acids, 6.3% free tall oil fatty acids and 4.8% free $C_{12}$ to $C_{14}$ alcohols.

10. The wire of claim 6 wherein the hydrogenated triglyceride is present in about 0.5% by weight, having a melting point of 47° C. to 50° C., an Iodine No. of 22 to 35, a Saponification No. of 188 to 195, a maximum Acid No. of 5 and approximate fatty acid component proportions of 8% $C_{14}$, 34% $C_{16}$, 27% $C_{18}$, 16% $C_{20}$ and 15% $C_{22}$ fatty acids.

11. The wire of claim 9 having an electrically insulating layer of polyester, polyvinylformal or polyurethane between the substrate and the nylon outer coating.

12. The wire of claim 10 having an electrically insulating layer of polyester, polyvinylformal or polyurethane between the substrate and the nylon outer coating.

* * * * *